(12) United States Patent
Brun et al.

(10) Patent No.: US 8,182,146 B2
(45) Date of Patent: May 22, 2012

(54) TEMPERATURE MEASUREMENT TUBE

(75) Inventors: Patrice Brun, Saint-Michel d'Euzet (FR); Jean-Francois Hollebecque, Velleneuve-les-Avignon (FR); Jacques Lacombe, Pujaut (FR); Valerie Petitjean, Clamart (FR)

(73) Assignees: Areva NC, Paris (FR); Commissariat a l'Energie Atomique, Paris (FR)

( * ) Notice: Subject to any disclaimer, the term of this patent is extended or adjusted under 35 U.S.C. 154(b) by 257 days.

(21) Appl. No.: 12/094,131

(22) PCT Filed: Nov. 30, 2006

(86) PCT No.: PCT/EP2006/069127
§ 371 (c)(1),
(2), (4) Date: May 16, 2008

(87) PCT Pub. No.: WO2007/063096
PCT Pub. Date: Jun. 7, 2007

(65) Prior Publication Data
US 2008/0298430 A1 Dec. 4, 2008

(30) Foreign Application Priority Data
Nov. 30, 2005 (FR) .................. 05 53658

(51) Int. Cl.
*G01K 1/00* (2006.01)
(52) U.S. Cl. ............... 374/208; 374/139; 374/148
(58) Field of Classification Search .............. 374/139, 374/148, 208
See application file for complete search history.

(56) References Cited

U.S. PATENT DOCUMENTS

| 3,301,715 | A | * | 1/1967 | Gerrard et al. ............... 136/222 |
| 3,530,716 | A | * | 9/1970 | Schernthaner et al. ....... 374/140 |
| 3,647,559 | A | * | 3/1972 | Truppe et al. ................ 136/234 |
| 3,647,560 | A | * | 3/1972 | Truppe et al. ................ 136/234 |
| 4,175,438 | A | * | 11/1979 | Wenzl et al. ................. 136/224 |
| 4,776,705 | A | * | 10/1988 | Najjar et al. ................. 374/139 |
| 4,984,904 | A | * | 1/1991 | Nakano et al. ............... 374/139 |
| 5,071,258 | A |   | 12/1991 | Usher et al. |
| 5,181,779 | A | * | 1/1993 | Shia et al. .................... 374/139 |
| 2006/0013282 | A1 | * | 1/2006 | Hanzawa et al. ............ 374/163 |

FOREIGN PATENT DOCUMENTS

| FR | 1 579 374 | 8/1969 |
| FR | 1579374 A | 8/1969 |
| GB | 1120547 A | 7/1968 |
| GB | 1599266 A | 9/1981 |

OTHER PUBLICATIONS

International Search Report and Written Opinion in International Application No. PC/EP2006/069127, mailed Mar. 5, 2007.

* cited by examiner

*Primary Examiner* — Lisa Caputo
*Assistant Examiner* — Mirellys Jagan
(74) *Attorney, Agent, or Firm* — Nixon Peabody LLP

(57) ABSTRACT

A temperature measurement tube is composite and comprises a rigid shaft (1), which is cooled so as to shield it from corrosion and from the melt, and an end-fitting (15) housing a thermocouple (9) on the end of the tube and constructed from a noble metal, which is resistant to corrosion and to the high melting point. An alumina coating (13) is placed between the two metals in order to prevent any corrosion-inducing electrochemical exchange between them.

11 Claims, 1 Drawing Sheet

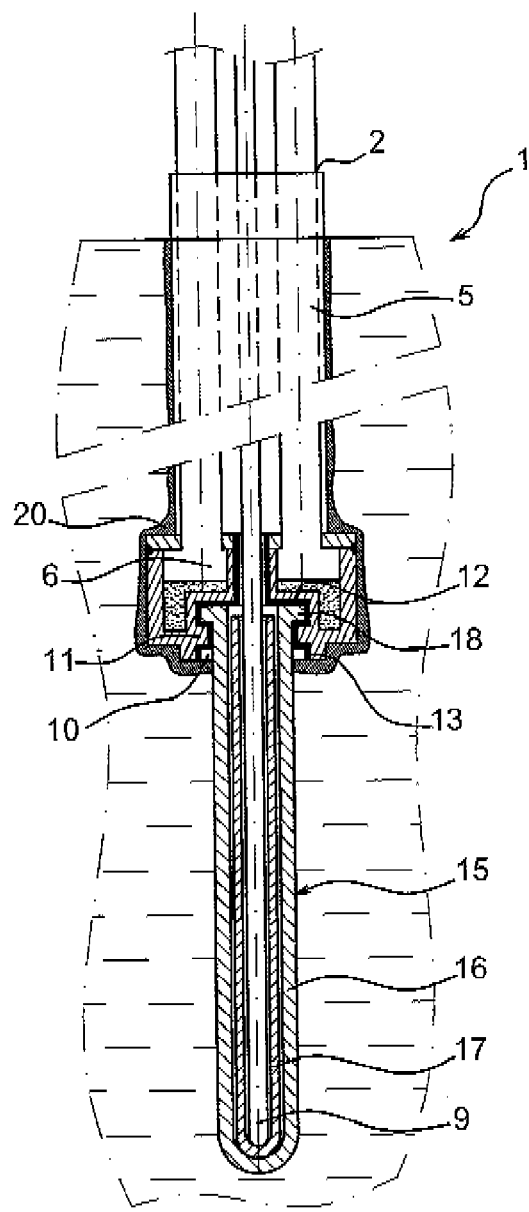
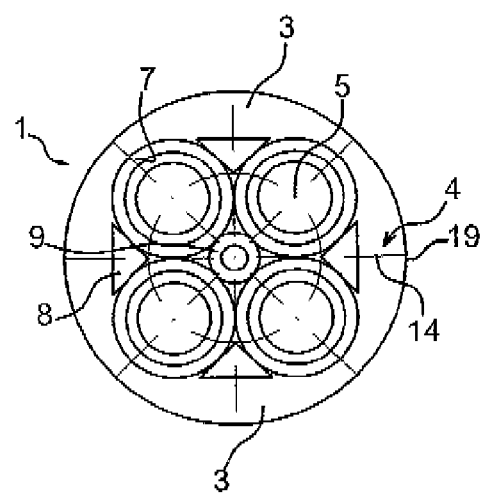

TEMPERATURE MEASUREMENT TUBE

CROSS REFERENCE TO RELATED APPLICATIONS OR PRIORITY CLAIM

This application is a national phase of International Application No. PCT/EP2006/069127, entitled "TEMPERATURE MEASUREMENT TUBE", which was filed on Nov. 30, 2006, and which claims priority of French Patent Application No. 05 53658, filed Nov. 30, 2005.

BACKGROUND

The invention relates to a temperature measurement tube, intended for uses in refractory materials melted at very high temperatures.

Such a tube must resist the temperatures reached, and also the often very high corrosion which is observed in certain glasses, within the molten material as well as in the atmosphere that emanates therefrom. Crucibles containing the molten material are often cooled in order to spare them from these difficult conditions by forming a crust of solidified matter on the wall thereof, which is cooler and less corrosive than the molten material, but which prevents the temperature from being taken at the wall of the crucible. Use is therefore made of sufficiently long measurement tubes that are immersed in the bath of molten material and which contain a temperature measurement sensor.

Such tubes must themselves be able to resist the temperature reached and corrosion. It is possible to construct them with a hollow shaft wherein the cooling water flows, in such a way as to spare them, as with the crucible, from direct contact with the molten material. The cooling however cannot be extended until the end of the tube, where the measurement sensor is located, in order to not render the latter impossible. GB-1-120-547-A discloses such a measurement tube of high temperatures comprising a solid end-fitting fixed by threading to the end of the cooled shaft. A measurement thermocouple extends in a through-bore established in the heart of the end-fitting. An intermediary temperature between the temperature reached by the cooling water and the outside temperature to be measured is present in the end-fitting, which makes it possible to take measurements of the outside temperature after a suitable correction. The end-fitting however remains subjected to the corrosion, since all of the known materials that have the rigidity required to construct a long tube are sensitive to the excess.

SUMMARY

The purpose of the invention is therefore to construct a temperature measurement tube that resists high temperatures as well as corrosion. Its shaft is of a known structure, hollow and cooled, but it is distinguished from measurement tubes by the presence of an end-fitting of a different material, of a material that is nobler than that of the shaft with regards to corrosion. The end-fitting therefore resists the conditions that it encounters without needing to be cooled, which allows the measurements to be taken by a sensor housed therein without having to frequently replace the end-fitting.

Note that simply changing the material of the end-fitting is not sufficient to provide a satisfactory result, since an electrochemical coupling is established between the end-fitting and the shaft by the matter in the melt bath and causes a corrosion reaction of the shaft despite the cooling. Additional dispositions must therefore be taken. Concretely, the end-fitting and the shaft are arranged concentrically, separated by an electrically-insulated circular lining, and pressed onto one another and on either side of the lining by a clamping means. The lining cuts the electrochemical circuit that is responsible for corrosion. It is exposed to the exterior of the tube, but does not suffer from the ambient temperature thanks to the cooling of the shaft, which covers it with a crust of protective solidified matter. The clamping means makes it possible to insert the lining and to renounce a screwed connection or any direct link between the rigid elements of the tube which are the shaft and the end-fitting.

Good resistance of the tube is provided if the shaft is constructed of steel, the lining of alumina, and the material of the end-fitting of a metallic metal and in particular chosen from among platinum, its alloys, metals in its family, iridium or molybdenum.

A good way to construct the tube, which provides a solid joint between the shaft and the end-fitting and avoids spacing, consists in using a shaft composed of two halves that are joined around the end-fitting and lining via the clamping means. Each of the halves of the shaft can then include a particular cooling duct that avoids any joint, which is hazardous for the sealing, of cooling ducts distributed over the two halves.

The solidity of the joint of the end-fitting to the shaft is more evident if the latter comprises a flange, and the halves of the shaft include halves of a housing groove of the flange, since a pulling off of the end-fitting is excluded; the insulating lining also extends in the groove.

Finally, advantageously, an insulating liner, i.e. that creates an electrical discontinuity, can be placed between the end-fitting and the sensor, surrounding the internal sensor inside the end-fitting: an overheating of the sensor is thus prevented even if the end-fitting is thin.

BRIEF DESCRIPTION OF THE DRAWINGS

FIG. 1 is an axial cross-section of the tube according to one embodiment of the invention.

FIG. 2 is a transversal cross section of the shaft according to one embodiment of the invention.

DETAILED DESCRIPTION

The description continues in relation to FIGS. 1 and 2, which show a preferred embodiment of the invention, FIG. 1 being an axial cross-section of the tube and FIG. 2 a transversal cross-section of the shaft. The tube comprises a shaft 1 of great length at the rear face 2 from wherein supply and disposal ducts of cooling water emerge and the wire of a temperature measurement thermocouple. The shaft 1 is hollow and divided into two symmetric halves 3 as shown in FIG. 2, where the joint face of the two halves 3 is referenced as 4. Each of the halves 3 is primarily occupied by a cooling circuit via water and comprises a parallel supply portion and a disposal portion and which are joined together at the very bottom in a water box 6. The tubes of the circuit 5 are flush with hollow pockets 7 of complementary form of the internal wall of halves 3 and on the triangular wedges 8 which extend between the tubes, which in addition touch one another. A compact and stable mounting is thus obtained. The wire of the thermocouple 9 passes between the four tubes and is flush against them. The shaft 1 is constructed of stainless steel.

The base of the shaft 1 comprises a lower insert 10 comprising an internal flange and a groove 12, which share the halves 3, above the flange 11. Some of the internal faces of the halves 3 of the shaft 1 carry an alumina lining deposited as a coating: this is the case with nook 10, where the coating bears the reference 13, and of the joint face 4 where it bears the reference 14.

The end-fitting, which shall now be addressed, bears the reference 15.

It comprises an external portion 16 in the form of a finger pocket constructed from platinum or from another metal or a noble alloy that is corrosion resistant, an internal portion 17 or liner made of alumina also in the form of a finger pocket, and a central recess occupied by the end of the thermocouple 9. In addition, the external portion 16 comprises a flange 18 engaged in the groove 12. It never comes directly across from the shaft 1, but is always in front of the alumina lining 13, which is circular and completely surrounds the end-fitting 15, which prevents any conduction of electricity with the shaft 1. The two halves 3 are joined to one another via welding spots 19 by maintaining a clamping of the alumina lining 13.

The cooling water creates a crust 20 of solidified matter around the shaft 1 and under it, which covers alumina linings 13 and 14 and protects them from destruction by melt. This quality is due to the cooling circuit 5 extending almost to the joint of the shaft 1 to the end-fitting 15, with elbows 6 being adjacent to nook 10. The thermocouple 9 is subjected to a temperature which is almost not influenced by the cooling. The clamping of the end-fitting 15 in the shaft 1 is carried out by a pressure of the internal flange 11 on the external portion 16, and maintenance of this is guaranteed by the flange 18 in the groove 12.

The invention claimed is:

1. Temperature measurement tube comprising an internal sensor in an end-fitting of the tube, the end-fitting comprising an external portion and an internal portion, a shaft attached to the external portion of the end-fitting, hollow and cooled, characterised in that the external portion of the end-fitting is comprised exteriorly of a nobler material with regards to corrosion than the shaft, the shaft and the external portion of the end-fitting have concentric portions, separated by an electrically-insulated lining, no other direct connection being provided between the shaft and the end-fitting, the lining extending between said portions, said portions of the shaft and of the external portion of the end-fitting being pressed onto one another and on either side of the lining by a clamping means that apply a pressure to the shaft on the external portion of the end-fitting while clamping the lining, the lining surrounding the external portion of the end-fitting.

2. Temperature measurement tube according to claim 1, characterised in that the shaft is made of steel, the lining of alumina, and the material at the end-fitting is chosen from among platinum, platinum alloys, metals of the platinum family, iridium, or molybdenum.

3. Temperature measurement tube according to claim 1, characterised in that the end-fitting comprises interiorly an insulating liner (17) surrounding the internal sensor (9).

4. Temperature measurement tube according to claim 1, wherein said tube comprises a cooling circuit for a liquid.

5. Temperature measurement tube according to claim 1, wherein the shaft surrounds the end-fitting.

6. Temperature measurement tube according to claim 1, wherein the lining is exposed to an exterior of said temperature measurement tube.

7. Temperature measurement tube according to claim 1, wherein the lining directly contacts both the external part of the end-fitting and the shaft, and the external part of the end-fitting is exposed to an exterior of said temperature measurement tube.

8. Temperature measurement tube according to claim 1, characterised in that the shaft is comprised of two halves (3) attached around the end-fitting and the lining by the clamping means.

9. Temperature measurement tube according to claim 8, characterised in that each of the halves of the shaft comprises a particular cooling duct.

10. Temperature measurement tube according to claim 9, characterised in that the end-fitting comprises a flange (18), the halves (3) of the shaft include halves of a housing groove (12) of the flange, and the lining extends into the groove.

11. Temperature measurement tube comprising an internal sensor in an end-fitting of the tube, a shaft attached to the end-fitting, hollow and cooled, characterised in that the end-fitting is comprised exteriorly of a nobler material with regards to corrosion than the shaft, the shaft and the end-fitting are concentric, separated by an electrically-insulated circular lining, and pressed onto one another and on either side of the lining by a clamping means, wherein the shaft comprises two halves attached around the end-fitting and the lining by the clamping means, each of the halves of the shaft comprises a particular cooling duct, the end-fitting comprises a flange, the halves of the shaft include halves of a housing groove of the flange, and the lining extends into the groove.

* * * * *